July 21, 1942.     R. L. TRIPLETT     2,290,849
ELECTRICAL MEASURING INSTRUMENT
Filed Jan. 5, 1940     2 Sheets-Sheet 1

Inventor
RAY L. TRIPLETT,
BY
Toulmin & Toulmin
Attorneys

July 21, 1942.   R. L. TRIPLETT   2,290,849
ELECTRICAL MEASURING INSTRUMENT
Filed Jan. 5, 1940   2 Sheets-Sheet 2
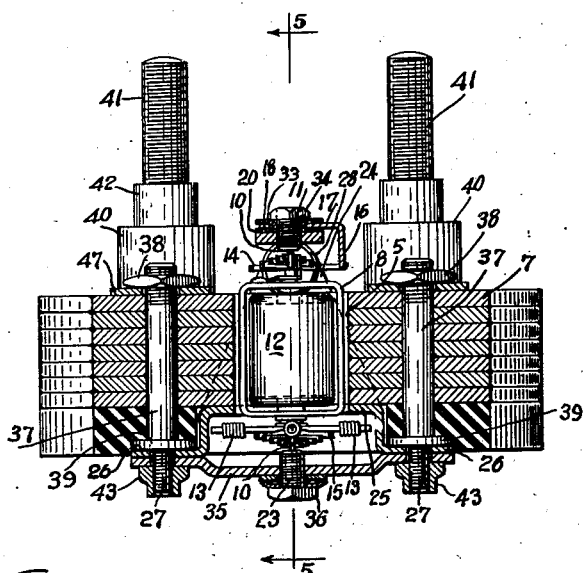
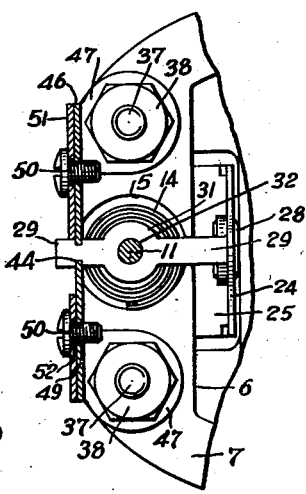
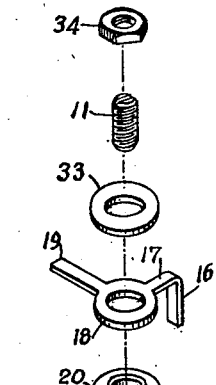
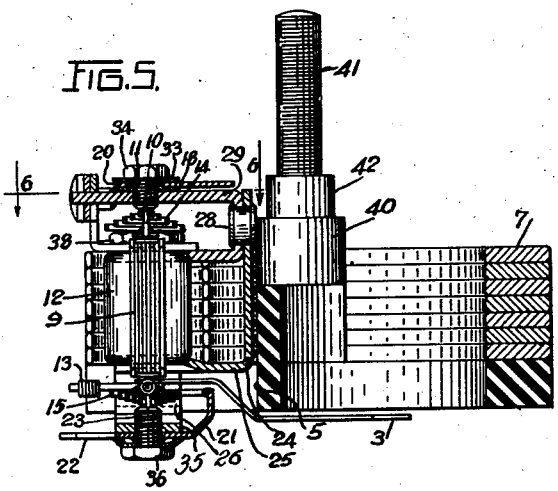
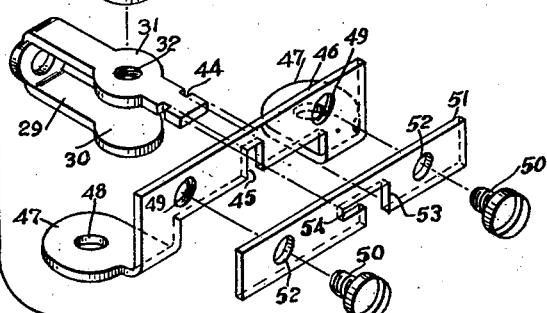
INVENTOR
RAY L. TRIPLETT,
BY Jaulmin & Jaulmin
ATTORNEYS Patented July 21, 1942

2,290,849

UNITED STATES PATENT OFFICE 2,290,849

ELECTRICAL MEASURING INSTRUMENT

Ray L. Triplett, Bluffton, Ohio

Application January 5, 1940, Serial No. 312,554

5 Claims. (Cl. 171—95)

The present invention relates to electrical apparatus, particularly instruments for measuring currents and voltages.

In ammeters and voltmeters the needle is caused to be actuated by the interaction between a movable coil carrying the current or voltage and the surrounding poles of a permanent magnet. Stub shafts extend from opposite ends of the frame on which the coil is mounted and these shafts are journaled in jewel bearings. Due to the sensitiveness of instruments of this character, particularly those which measure very small currents or voltages, the friction at the jewel bearings must be carefully controlled.

In the prior art form of instrument it was customary to mount the jewel bearings on the magnet assembly and after the movement had been inserted in place the pressure applied at the bearings was adjusted. This has not been altogether satisfactory since this adjustment calls for an operation which is performed after the assembly of the complete unit, including the magnet, whereas the adjustment could more conveniently and more accurately be performed before the movement was placed in the magnet assembly.

The primary object of the present invention is to provide an improved electrical measuring instrument of simple design and one in which the necessary adjustments may be readily made. A more particular object is to provide an instrument in which the movable element, including its jewel bearings, may be adjusted prior to the insertion of the movement into the magnet assembly. A still further object is to provide an instrument of this character in which there is a provision for removing the movable element and its bearings from the magnet assembly for inspection and servicing operations. The above objects are attained in brief by incorporating the movable coil, the pointer and its immediately associated apparatus including the jewel bearings as a unit, complete in itself and detachable as a unit from the magnet assembly. One end of the unit is supported in an improved locking device in the form of a truss bridge which holds the end of the movement firmly in all directions except the direction of rotation and yet may be readily detached or unlocked to permit removal of the movement and its bearings from the magnet assembly.

The invention will be better understood when reference is made to the following description and the accompanying drawings.

Referring to the drawings:

Figure 4 is a sectional view taken along a line 4—4 in Figure 2.

Figure 5 is a cross sectional view taken along line 5—5 in Figure 4.

Figure 6 is a partial sectional view taken along line 6—6 in Figure 5.

Figure 7 is an exploded view of one of the bearing members and associated structure which can be readily detached from the magnet assembly when it is desired to remove the rotating element.

Figure 1:
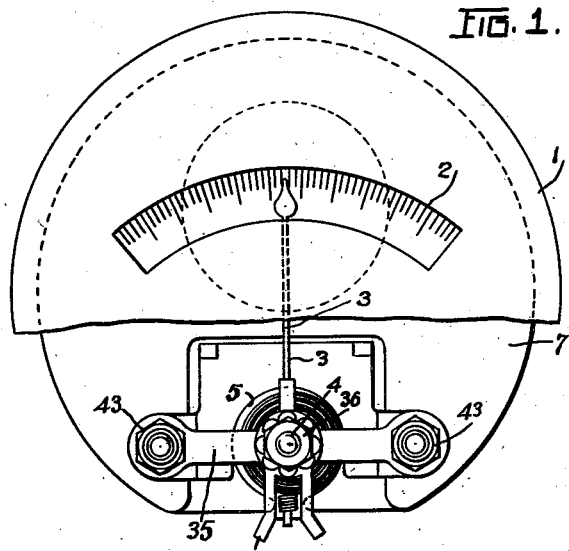
Figure 1 is a plan view of the improved instrument with a portion of the dial face removed so as to expose the under parts.
Figure 2:
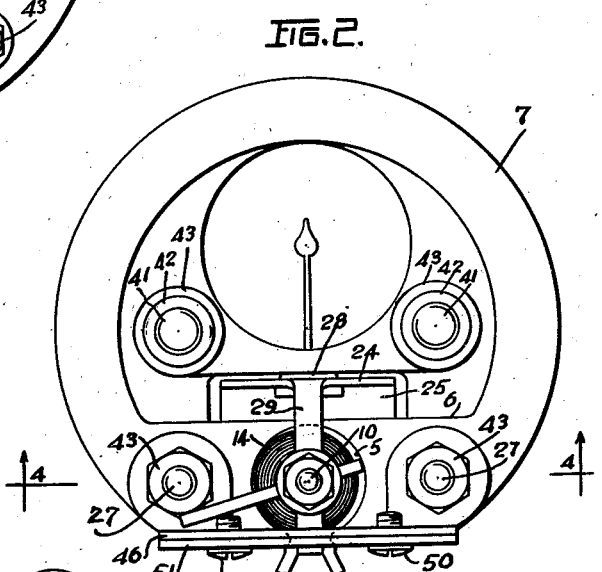
Figure 2 is a view looking directly at the rear of the instrument.
Figure 3:
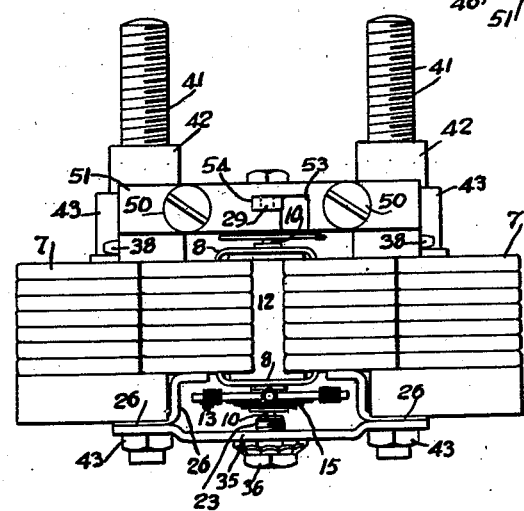
Figure 3 is an end view of the instrument in elevation.

Referring more particularly to Figures 1 to 3, numeral 1 designates a white faced dial having the indications 2 marked thereon over which the pointer 3 moves in response to current or voltage applied to the instrument. The pointer is pivoted at 4 which is positioned at the center of a circular opening 5 formed by the legs 6 of a magnet assembly 7. As can be seen in Figure 3 this assembly is constituted of a number of relatively thin iron stampings which are magnetized so that the legs 6 form north and south poles.

The element or movement which rotates in the opening 5 and is therefore subject to the magnetic field is constituted of a narrow rectangular frame 8 of insulating material on which is wound a coil 9. The frame 8 is carried at each end on shafts 10 which are journaled at their outer ends in jewels contained within screw members 11 and 23. Within the frame 8 there is positioned a metal cylinder 12 fixed in space and secured to the magnet assembly in the manner described hereinafter. The diameter of the cylindrical member 12 is such as to permit the frame 8 to swing about the same. The pointer 3 constitutes one of four spokes which project radially from the lower shaft 10 (Figure 4) these spokes equidistantly spaced about the shaft and extending horizontally with respect to the instrument. The spokes other than the pointer are weighted at their ends as indicated at 13, these weights serving to balance the pointer as it moves with the shaft 10. Voltages are impressed across the coil 9 through a pair of hair springs 14, 15, the connections being preferably made from the center of each spring, either through the shaft or by separate wire to each end of the coil. In addition to serving as an electrical connecter between the stationary and movable parts of the meter, the springs 14, 15 serve to tension the pointer 3 and to adjust the same to its correct zero position. One end of the upper spring 14 is secured to the depending leg 16 of an arm 17 which extends radially outwardly from a washer 18 pivoted on the axis of the shaft 10. This washer carries arm 19 by which the washer may be rotated and thus either increase or decrease the tension applied to the spring 14. As, can be seen in Figure 7 washer 18 is journaled on the shoulder of a washer 20, the latter being secured to the screw 11 which contains one of the jewel bearings.

The inner end of the lower spring 15 (Figure 5) is secured to the shaft 10 and the outer end of the spring is fastened to a finger 21 which projects upwardly from a forked lever 22 pivoted on a screw 23. This screw carries a jewel bearing for the lower end of the lower shaft 10. Thus by rotating the forked lever 22 the tension on the spring 15 can be adjusted which in turn either increases or decreases the normal torsion applied to the pointer 3 depending on the direction in which the lever is moved. In practice it is usual for the manufacturer to permanently adjust the tension on the spring 14 by moving the arm 19 leaving provision for further adjustment if necessary by the user, by means of the forked lever 22 which operates on the opposite spring.

The screw members 11, 23 are held at a fixed distance apart by a rigid frame to be described presently and which is so designed as to be readily detached from the magnet assembly without disassembling the bearings. This frame constitutes essentially a triangularly shaped upright plate indicated at 24 (Figure 5) and the triangular configuration is indicated by the dotted lines in Figure 4. The lower end of the triangular plate is bent to a horizontal portion 25 which terminates in a pair of oppositely disposed ears 26 having openings for receiving screws 27. The lower end of the cylinder 12 is secured at the horizontal portion 25 to the triangular plate 24.

The upper end of the plate 24 is riveted as indicated at 28 or otherwise secured to a U-shaped member 29. The lower leg of this member terminates in a circular portion 30 (Figure 7) which is secured in any suitable manner to the top surface of the cylinder 12. Thus the latter is rigidly affixed to the triangular plate member 24. The upper leg of the U-shaped element 29 is provided with a circular portion indicated at 31 directly above the lower circular portion 30 and contains a tapped hole 32 adapted to receive the upper screw 11. As pointed out hereinbefore this screw fits into the opening in the shouldered washer 20 and the latter carries the member 18 on the shoulder. In order to complete the assembly a washer 33 is placed over the washer portion 18 when the screw 11 is screwed into the tapped hole 32 and a nut 34 is screwed down on the upper end of the screw 11 to thereby secure the washers 33, 18 and 20 to the upper leg of the U-shaped member 29. Thus the screw 11 which carries the upper bearing of the upper shaft 10 is held fixedly in place to the triangular shaped member 24.

For securing the lower screw member 23 into position, the ears 26 are provided with a bridge element 35 which extends across the center of the lower shaft 10. This element has a tapped hole for receiving the screw 23 and the latter is locked in place by a nut 36.

It is apparent that the entire rotatable element or movement including its jewel bearings are supported within a rigid frame constituted of the upper leg of the U-shaped member 29, the triangular shaped plate 24 and its horizontal portion 25 from which the ears 26 extend and finally the bridge member 35 which carries the lower screw 23.

The screws 27 form the lower part of bolts 37 (Figure 4) which extend through the entire magnet assembly to hold the plates of the latter in place. The upper ends of the bolts 37 are threaded to receive nuts 38 and the lower ends of these bolts, in addition to the screw extensions 27, are also provided with shoulders 39. These shoulders are for the purpose of clamping a plate of insulating material such as a phenolic condensation product to the magnet assembly, this plate taking the general form of the magnets and being provided with a pair of upright pillars 40. Screw uprights 41 having a shoulder 42 are secured in any suitable manner in the pillars 40. These screws are adapted to receive a nut (not shown) for the purpose of mounting the instrument on a switchboard or panel. The lower threaded ends of the bolts 37 (Figure 4) receive a nut 43 for securing the bridge member 35 to the ears 26.

As pointed out hereinbefore the rotatable element 8 and it bearings 11, 23 are held within a rigid frame which is secured at one end to the magnet assembly through the bolts 37 and held in position by the nuts 43. The latter also serve to secure the bridge element 35 to the ears 26. In order to assure that the upper end of the rigid frame carrying the jewel bearings and the rotatable element is securely mounted with respect to the magnet assembly, I provide a locking arrangement which can be so operated as to permit the ready removal of the upper portion of the frame. This arrangement is shown in detail in Figures 6 and 7. The upper leg of the member 29 is provided with a pair of inwardly extending slots indicated at 44 and these slots fit snugly within a vertical notch 45 provided in the flat bridge plate 46. This plate is provided at each end with a wing 47 having an opening 48 which receives the upper end of the bolt 37 (Figure 4). The plate 46 is provided with a pair of tapped openings 49 for receiving screws 50. The latter secure a metal plate 51 to the plate 46 by means of the openings 52. The plate 51 has a vertically extending slot 53 of a width adapted to receive that portion of the member 29 which extends outwardly from the slots 44. This slot 53 also has a horizontally extending portion 54 which is of a width or depth snugly to receive the thickness of the upper leg of the member 29. The manner in which the member 29 and the plates 46 and 51 can be assembled and held together by the screws 50 will be apparent from a study of Figure 7 and the dot-dash lines made in connection therewith. In assembly the member 29 is so positioned in respect to the plate 46 that the slots 44 engage the vertical edges of the slot 45 leaving a portion of the member 29 extending beyond the slot 45. This extending portion is first received by the vertical slot 53 of the plate 51 and the latter is then pushed to the right, as seen in Figure 7, until the horizontal portion 54 of the slot engages this extension. At this time, the openings 52 and 49 will be in alignment so that the screws 50 can be placed in position. When the plate 51 is tightened against the plate 46 it will be noted that the member 29 is positively prevented by the plates 46, 51 from moving forward, backward or sidewise. It was pointed out that the openings 48 are engaged by the bolts 37 and thus the plate 46 is rigidly held to the magnet assembly. It will be further recalled that the opening 32 in the member 29 receives the bearing screw 11, consequently, the latter is securely held in position with respect to the magnet assembly.

In order to permit removal of the member 29 and the bearing screw 11 from the magnet assembly it is necessary only to remove the screws 50 and to push the plate 51 to the left, thereafter disengaging the slots 44 from the plate 46 so that the whole upper end of the rigid frame which carries the rotatable element and its bearings will be loose from the magnets. The lower end of this frame can be detached simply by removing the nuts 43 and it will be found that the entire rotatable assembly and its bearings, including the pointer 3, can be dropped through the opening 5 while still maintaining the bearing and torsional adjustments. Thus the assembly can be inspected and readily repaired if necessary and given further adjustment. After servicing, the movement may be reassembled by simply placing the bridge portion 35 on the screw studs 27, applying the nuts 43 and placing the slotted end of the member 29 in the plates 46, 51 as described above in order to secure both of the bearings 11, 23 to the magnet assembly. The assembly and disassembly operations or vice versa can be accomplished in a few seconds time without skilled labor and without the slightest danger of any maladjustment of the bearings or maladjustment of the torsion which had previously been set in an accurate manner by the factory.

It is apparent that during disassembly the bolts 37 and the plate 46 secured thereto by the nuts 38 remain rigidly in place, having been properly aligned in position preferably at the factory. It is not desirable to disturb the laminated type of magnet after it is once assembled and magnetized and for this reason the pre-alignment of plate 46 is desirable and the nuts 38 do not at any time have to be removed. The pre-alignment with the pole piece opening 5 and the slot 45 is done with a special plug fitting the opening 5 and having an extension and accurate arrangement to the plug for engaging the slot 45. The plug is then removed before inserting the movable element in the pole piece opening 5.

Having thus fully described my invention, what I claim as new and desire to secure by Letters Patent, is:

1. An electrical measuring instrument comprising a plurality of metal plates secured together and terminating in pole pieces, a coil mounted on a pair of shafts adapted to rotate between said pole pieces, bearings for said shafts carried on a rigid frame, means including a pair of bridges for securing the ends of the frame to opposite sides of the metal plate assembly, one of said bridges being fixedly secured to one end of said frame and the other of said bridges being detachably secured to the other end of said frame, said last-mentioned bridge including a device which is adapted to latch the frame in position when the device is slidably operated.

2. An electrical measuring instrument comprising a plurality of metal plates secured together and terminating in pole pieces, a coil mounted on a pair of shafts adapted to rotate between said pole pieces, bearings for said shafts carried on a rigid frame, means including a pair of bridges for securing the ends of the frame to opposite sides of the metal plate assembly, one of said bridges being fixedly secured to one end of said frame and the other of said bridges being detachably secured to the other end of said frame, said last-mentioned bridge including a latching device and a support member which prevents movement of the frame in the direction of the bearing axis and also in a direction lateral thereto.

3. An electrical measuring instrument comprising a magnet assembly terminating in opposed pole pieces, a coil adapted to rotate between the pole pieces, said coil being mounted on stub shafts, end bearings for the shafts, and means for adjusting said bearings, said coil, shafts and bearings being assembled and adjusted as a unit apart from said magnet assembly, means on said magnet assembly for receiving and securing the coil, shaft and bearing unit in its adjusted condition, said last mentioned means including an extension of one of the bearings and a device for detachably locking the extension to the magnet assembly, said device including a bridge support secured to the magnet assembly and having a notch which receives said extension, and means for latching the extension within the notch.

4. An electrical measuring instrument comprising a plurality of metal plates secured together by a pair of bolts and terminating in pole pieces, a coil mounted on stub shafts and adapted to rotate between the pole pieces, end bearings for the shafts, said bearings being carried by a rigid frame, means for detachably mounting said frame on the magnet assembly, said frame including a bridge member which spans said bolts at one side of the magnet assembly, said bridge member carrying one of said bearings, said frame mounting means including a flat bar extending from the other of said bearings, a second bridge spanning said bolts at the side of the assembly opposite the first-mentioned bridge member and a device for detachably securing said flat bar to said second bridge, said device being adapted to latch the frame in position when the device is slidably operated.

5. An electrical measuring instrument comprising a plurality of metal plates secured together by a pair of bolts and terminating in pole pieces, a coil mounted on stub shafts and adapted to rotate between the pole pieces, end bearings for the shafts, said bearings being carried by a rigid frame, means for detachably mounting said frame on the magnet assembly, said frame including a bridge member which spans said bolts at one side of the assembly, said bridge member carrying a portion of the frame, said frame mounting means including a flat bar extending from the portion of said frame opposite said bridge member and having a pair of oppositely disposed notches across the vertical dimension of the bar, a plate secured to said bolts at the side of the assembly opposite said bridge member, said plate having a vertical slot which receives the notched portion of said bar whereby the bar and the frame are prevented from moving with respect to the magnet assembly in a direction transverse the axis of said shaft, and a plate having a horizontal slot for receiving the vertical edge of said bar beyond the notched portion whereby the bar and the frame are prevented from moving with respect to the magnet assembly in the direction of the axis of said shafts.

RAY L. TRIPLETT.